(12) United States Patent
Isenberg

(10) Patent No.: US 8,843,372 B1
(45) Date of Patent: Sep. 23, 2014

(54) NATURAL CONVERSATIONAL TECHNOLOGY SYSTEM AND METHOD

(71) Applicant: Herbert M. Isenberg, Greenbrae, CA (US)

(72) Inventor: Herbert M. Isenberg, Greenbrae, CA (US)

( * ) Notice: Subject to any disclaimer, the term of this patent is extended or adjusted under 35 U.S.C. 154(b) by 37 days.

(21) Appl. No.: 13/724,390

(22) Filed: Dec. 21, 2012

Related U.S. Application Data

(63) Continuation-in-part of application No. 13/053,008, filed on Mar. 21, 2011, now abandoned.

(60) Provisional application No. 61/315,563, filed on Mar. 19, 2010.

(51) Int. Cl.
  *G10L 17/00* (2013.01)
  *G10L 15/00* (2013.01)
  *G10L 17/26* (2013.01)

(52) U.S. Cl.
  CPC ............... *G10L 15/00* (2013.01); *G10L 17/26* (2013.01)
  USPC .......................................................... 704/250

(58) Field of Classification Search
  USPC .................................................. 704/231–257
  See application file for complete search history.

(56) References Cited

U.S. PATENT DOCUMENTS

| | | | |
|---|---|---|---|
| 7,933,399 B2 | 4/2011 | Knott et al. | |
| 2005/0088981 A1* | 4/2005 | Woodruff et al. | 370/260 |
| 2009/0112590 A1* | 4/2009 | Pulz et al. | 704/246 |
| 2011/0282669 A1* | 11/2011 | Michaelis | 704/270 |
| 2014/0020084 A1* | 1/2014 | Gross | 726/16 |

OTHER PUBLICATIONS

Sacks, H., Schegloff, E. A., and Jefferson, G. (1974). A Simplest Systematics for the Organization of Turn-Taking for Conversation. Language, 4, 696-735.
Francis, G., & Hunston, S. (1992). Analysing everyday conversation. In M. Coulthard (ed.), Advances in Spoken Discourse Analysis (pp. 123-161). London: Routledge.
Eaton, P.S., Freuder, E.G., and Wallace, R.J. (1998). Constraints and Agents Confronting Ignorance. Al Magazine, 19(2), 51-65.
Wilson, M., and Wilson, T.P. (2005). An oscillator model of the timing of turn-taking. Psychonomic Bulletin and Review, 12(6), 957-968.
Shuy, R.W. (2007). "Language in the American Courtroom", Internet Web Page at https://blogs.commons.georgetown.edu/mlc-resources/files/2009/09/Shuy-2007.pdf.

(Continued)

*Primary Examiner* — Abul Azad
(74) *Attorney, Agent, or Firm* — David Pressman

(57) ABSTRACT

A system for analyzing conversations or speech, especially "turns" (a point in time in a person's or an animal's talk when another may or does speak) comprises a computer (100) with a memory (105), at least one microphone (115, 120), and software (110) running in the computer. The system is arranged to recognize and quantify utterances including spoken words, pauses between words, in-breaths, vowel extensions, and the like, and to recognize questions and sentences. The system rapidly and efficiently quantifies and qualifies speech and thus offers substantial improvement over prior-art computerized response systems that use traditional linguistic approaches that depend on single words or a small number of words in grammatical sentences as a basic unit of analysis. The system and method are useful in many applications, including teaching colloquial use of turn-taking, and in forensic linguistics.

20 Claims, 2 Drawing Sheets

(56) References Cited

OTHER PUBLICATIONS

Hinrich, S.W. (2008). The use of questions in international pilot and air traffic controller communication (Unpublished doctoral dissertation). Oklahoma State University, Stillwater, OK.

Timmermeyer K. (2008). "ESL Basic Introduction Lesson", Internet Web Page at http://suite101.com/article/esl-basic-introduction-lesson-a77915.

Raffensperger, P.A., Webb, R.Y., Bones, P.J., and McInnes, A.I. (2011). A simple metric for turn-taking in emergent communication. Source unknown.

Hitt, J. (2012). "Words on Trial", The New Yorker magazine, Internet Web Page at http://www.newyorker.com/reporting/2012/07/23/120723fa_fact_hitt.

Forensic Linguists, http://en.wikipedia.org/wiki/Forensic_linguistics. (2008).

Wikipedia, Speaker recognition, http://en.wikipedia.org/wiki/Speaker_recognition [Sep. 12, 2012 4:36:56 PM].

A. Raux, "Flexible Turn-Taking for Spoken Dialog Systems", PhD Thesis, Dec. 2008, 151 pp., School of Computer Science, Carnegie Mellon U., Pittsburgh, PA.

H. M. Isenberg, "The Organization of Conversation", Research Paper, pub. approx. Feb. 2010, 5 pp., Published at http://scholar.google.com/scholar?hl=en&q=The+organization+of+conversation&btnG=&as_sdt=1%2C5&as_sdtp=.

H. M. Isenberg, A Study of Communication Strategies in Two Medical Settings, 1980, extract from PhD Thesis, 99 pp., U. of Calif., San Diego, Pub. By University Microfilms Int., Ann Arbor, MI.

\* cited by examiner

NATURAL CONVERSATIONAL TECHNOLOGY SYSTEM AND METHOD

CROSS-REFERENCE TO RELATED APPLICATIONS

This application is a continuation-in-part of application Ser. No. 13/053,008, Filed Mar. 21, 2011, which claims the benefit of Provisional Patent Application Ser. No. 61/315,563, Filed Mar. 19, 2010.

COPYRIGHT NOTICE

A portion of the disclosure of this patent document contains material which is subject to copyright protection. The copyright owner has no objection to the facsimile reproduction by any one of the patent document or the patent disclosure, as it appears in the Patent and Trademark Office patent file or records, but otherwise reserves all copyright rights whatsoever.

BACKGROUND

Prior Art

In the past, scientists have tried to teach computers and other intelligent devices how to converse and behave like human beings. (The term "computer" includes any intelligent device, such as a bot, a robot, an artificial person, a smart phone, and so on. A bot is a software program that imitates the behavior of a human, as by querying search engines or participating in chatroom, or discussing matters for an information resource center.) However, they have not completely succeeded. Computers have not been able to mimic the natural cadence, wording, responsiveness, etc. of a human, so that they are usually recognizable as a computer and not a human. Thus one of their goals has been to program a computer so that when it is having a conversation with a human being, the conversation will be so natural and spontaneous that the human participant will not be able to tell if it is a human or computer that is talking. Existing approaches rely on various modes of formal linguistics such as mathematical and computational linguistics.

Today, many companies replace human operators with voice-recognition software. While successful in specific circumstances, the capabilities of this software are often limited to these particular circumstances. When a caller replies with a word or sentence that is not understood, or somewhat irregular, the software usually defers to a human operator. If a caller's response is misinterpreted, an incorrect response occurs.

Phone voice recognition software does not account for the interactional components of the phone conversation. This places limitations on 1) The caller's ability to express and clarify their needs and 2) The efficiency of the overall system. For example, calls may be misdirected and a caller's input may be limited to a few words.

Linguistics

What is commonly referred to as mathematical linguistics comprises two areas of research: statistical linguistics—the study of the statistical structure of texts, and algebraic linguistics—the construction of mathematical models of the phonological and grammatical structure of languages. These two branches are typically distinct. Attempts have been made to derive the grammatical rules of languages from the statistical structure of texts written in those languages, but such attempts are generally thought to have been unsuccessful so far in practice, but also, in principle, doomed to failure. That languages have a statistical structure is a fact well known to cryptographers. Within linguistics it is of considerable typological interest to compare languages from a statistical point of view, such as the ratio of consonants to vowels, of nouns to verbs, and so on.

Algebraic linguistics derives principally from the work of Noam Chomsky in the field of generative grammar. In his earliest work Chomsky described three different models of grammar—finite-state grammar, phrase-structure grammar, and transformational grammar. These three branches will not be discussed.

Finite-State Grammar

In finite-state grammar, a machine has a finite number of internal states and operates by moving from one state to another by producing a transition symbol, such as a word. After producing a number of concatenated words, i.e., a sentence, the machine ends in a final state. Thus a speaker expresses a thought by speaking a number of words and then stops, i.e., the sentence ends in a period. E.g., "The boy hit the ball over the fence."

Phrase-Structure Grammar

Phrase-structure grammar describes a language's syntax. A sentence comprises a series of constituent parts, i.e., a noun phrase and a verb phrase. These are divisible into additional categories such as an adjectival phrase, an adverbial phrase, and a prepositional phrase. E.g., the sentence, "The young boy hit the soft ball over the big fence early in the last inning of the game." contains the following phrases:

Nounal phrase: "The young boy"
Verbal phrase: "boy hit the soft ball over the big fence early in the last inning of the game."
Adjectival phrase: "the big fence". The adjective "big" describes a quality of the fence, i.e.,
What kind of fence?
Adverbial phrase: "early in the last inning of the game". The adverb "early" describes when the action took place. Adverbs modify, e.g., When in the last inning of the game? Early.
Prepositional phrase: "in the last inning of the game". A preposition describes a relationship between other words in a sentence. The word "in" is a preposition.

Transformational Grammar

Transformational grammar analyzes the relationships among the elements of a sentence and expresses these relationships through a number of rules. E.g., an active sentence, "The child threw the ball." is compared with a passive one, "The ball was thrown by the child."

Chomsky compared these types of grammar in terms of their capacity to generate all and only the sentences of natural languages, thereby producing an understanding of the underlying formal principles and processes of language.

Other models have been investigated and it has been shown that certain different models are equivalent in generative power to phrase-structure grammars. The problem is to construct a model that has all the formal properties required to handle the processes found to be operative in languages but that prohibits rules that are not required for linguistic description. It is an open question whether such a model, or one that approximates more closely to this ideal than current models do, will be a transformational grammar or a grammar of some radically different character.

Computational Linguistics

Computational linguistics is the use of electronic digital computers in linguistic research. Moving beyond prior manual analysis, computers are employed to rapidly and reliably scan texts and produce such valuable aids to linguistic and stylistic research as word lists, word frequency counts, and concordances.

More interesting, though much more difficult, is the automatic grammatical analysis of texts by computer. Considerable progress was made in this area by research groups around the world working on machine translation and information retrieval during the decade between the mid-1950s and the mid-1960s. But much of the original impetus for this work disappeared, for a time at least, in part because of the realization that the theoretical problems involved in machine translation are much more difficult than they were at first thought to be, and in part as a consequence of a loss of interest among linguists in the development of discovery procedures, i.e., a set of rigorous methods by which to analyze language. Whether automatic syntactic analysis and fully automatic high-quality machine translation are even feasible in principle remains a controversial question.

The following is an exemplary list of some possibly relevant representative references that show such prior-art methods. This list is organized chronologically by publication date in order to illustrate the origin and academic follow-on of a prior-art process called "turn-taking, the ordering of speakers in a conversation, the ways in which one person speaks and then a next person speaks, which is referred to as turn-taking in a conversation.

Sacks, H., Schegloff, E. A., and Jefferson, G. (1974). A Simplest Systematics for the Organization of Turn-Taking for Conversation. *Language,* 4, 696-735.

Francis, G., & Hunston, S. (1992). Analysing everyday conversation. In M. Coulthard (ed.), *Advances in Spoken Discourse Analysis* (pp. 123-161). London: Routledge.

Eaton, P. S., Freuder, E. C., and Wallace, R. J. (1998). Constraints and Agents Confronting Ignorance. *AI Magazine,* 19(2), 51-65.

Wilson, M., and Wilson, T. P. (2005). An oscillator model of the timing of turn-taking. *Psychonomic Bulletin and Review,* 12(6), 957-968.

Shuy, R. W. (2007). "Language in the American Courtroom", Internet Web Page at https://blogs.commons.georgetown.edu/mlc-resources/files/2009/09/Shuy-2007.pdf.

Hinrich, S. W. (2008). *The use of questions in international pilot and air traffic controller communication* (Unpublished doctoral dissertation). Oklahoma State University, Stillwater, Okla.

Timmermeyer, K. (2008). "ESL Basic Introduction Lesson", Internet Web Page at http://suite101.com/article/esl-basic-introduction-lesson-a77915.

Raffensperger, P. A., Webb, R. Y., Bones, P. J., and McInnes, A. I. (2011). *A simple metric for turn-taking in emergent communication.* Source unknown.

Hitt, J. (2012). "Words on Trial", The New Yorker magazine, Internet Web Page at http://www.newyorker.com/reporting/2012/07/23/120723fa_fact_hitt.

Additional information is available on the Internet at http://en.wikipedia.org/wiki/Forensic_linguistics.

Sacks et al. introduced the prior-art concept of turn-taking in 1974. Sacks defined turn-taking in a list of rules that are applied after the fact by researchers who analyze conversations. Sacks' analysis is later referenced in numerous texts and papers. The following rules are contained in the Sacks reference cited above. I provide an explanation of these rules below.

After a conversation was recorded and transcribed Sacks et al. defined a set of rules that attempted to account for the observation that two or more people spoke during the conversation in what appears to be an orderly manner. The following is a reproduction of these rules:

"3.3. RULES. The following seems to be a basic set of rules governing turn construction, providing for the allocation of a next turn to one party, and coordinating transfer so as to minimize gap and overlap.

(1) For any turn, at the initial transition-relevance place of an initial turn constructional unit:
  (a) If the turn-so-far is so constructed as to involve the use of a 'current speaker selects next' technique, then the party so selected has the right and is obliged to take next turn to speak; no others have such rights or obligations, and transfer occurs at that place.
  (b) If the turn-so-far is so constructed as not to involve the use of a 'current speaker selects next' technique, then self-selection for next speakership may, but need not, be instituted; first starter acquires rights to a turn, and transfer occurs at that place.
  (c) If the turn-so-far is so constructed as not to involve the use of a 'current speaker selects next' technique, then current speaker may, but need not continue, unless another self-selects.
(2) If, at the initial transition-relevance place of an initial turn-constructional unit, neither 1a nor 1b has operated, and, following the provision of 1c, current speaker has continued, then the rule-set a-c re-applies at the next transition relevance place, and recursively at each next transition-relevance place, until transfer is effected." (Ibid, p. 704)

The rules themselves basically imply that the person currently speaking has options and that other speakers who are not talking also have options, or ways to express themselves during the course of the conversation. We will refer to people not talking as listeners.

From the current speaker's position the person that is currently talking in a conversation can continue talking or the current speaker can select someone else to speak. For example, the current speaker can select the next speaker by naming that person, such as, "Mike, what do you think of this idea?"

From the listener's position their options include, 1) Continue listening, or 2) Start talking, referred to as 'self-selection".

The rules imply that if a listener does self-select and start talking, that the person will do so in an appropriate manner, referred to as a " . . . turn transition relevant place . . . "

The rules distill down to accounting for, after the fact, the observation that multiple people speak in a conversation in what appears to be an orderly fashion.

While thorough, these rules do not lend themselves to rapid, computerized identification of turn-taking in conversations.

Henrich et al. and Raffensperger et al., supra, refer to the above paper by Sacks, but offer no new rules for analyzing turn-taking.

Eaton et al., supra, discuss turn-taking, but make no reference to Sacks' work and offer no new rules for interpreting it.

Wilson et al., supra, attribute the first exploration of turn-taking to Sacks et al., but offer no new rules for analyzing it.

SUMMARY

I have discovered what I believe to be a basic unit of speech analysis and interpretation not previously used in linguistics. This unit can be used to improve the understanding of human communication through the use of computers, enabling them to more successfully understand and respond to other speakers—humans and even other computers. Understanding speech through the use of this unit enables the design of computerized intelligent speech algorithms that provide for a significant improvement over the prior art systems of today.

My approach, which I call "Natural Conversational Technology" (NCT), is a new way of thinking about linguistics; it uses a basic unit of analysis called a "turn". In NCT a turn is defined as a point in time when the current speaker starts speaking, makes, produces, or forms an in-breath, a sentence intonation, a question intonation, a vowel extension, a pause for 0.3 second or greater, or a when an another participant to the conversation vocalizes a sound or a word. In one aspect, NCT can provide the missing components to phone answering systems to greatly increase their efficiency, accuracy and the user experience.

For example, in NCT a first turn occurs when a first person utters a sound, word, phrase or sentence. When a participant speaks, they become the "first person" by the act of speaking first.

A second turn occurs when another participant speaks or the current speaker continues to talk. This is called a turn-transition point, i.e. a point in the conversation where another party can or does speak, thereby initiating a second turn, and so forth.

The concepts taught herein enable a computer to model and quantify conversation, then use this information to enable the computer to participate in conversational interactions so naturally that an outside observer will not be able to distinguish the computer from a human.

A computer runs one or more algorithms that analyze, quantify, and qualify turns in a conversation by attributing utterances to one or another party to the conversation. In one aspect, the analysis uses keywords to identify questions.

Thus in NCT, a turn is "a point in time in one's talk when another may or does speak," and an array is "a plurality of concurrent turns by one speaker".

DEFINITIONS OF TERMS

Figure 1:
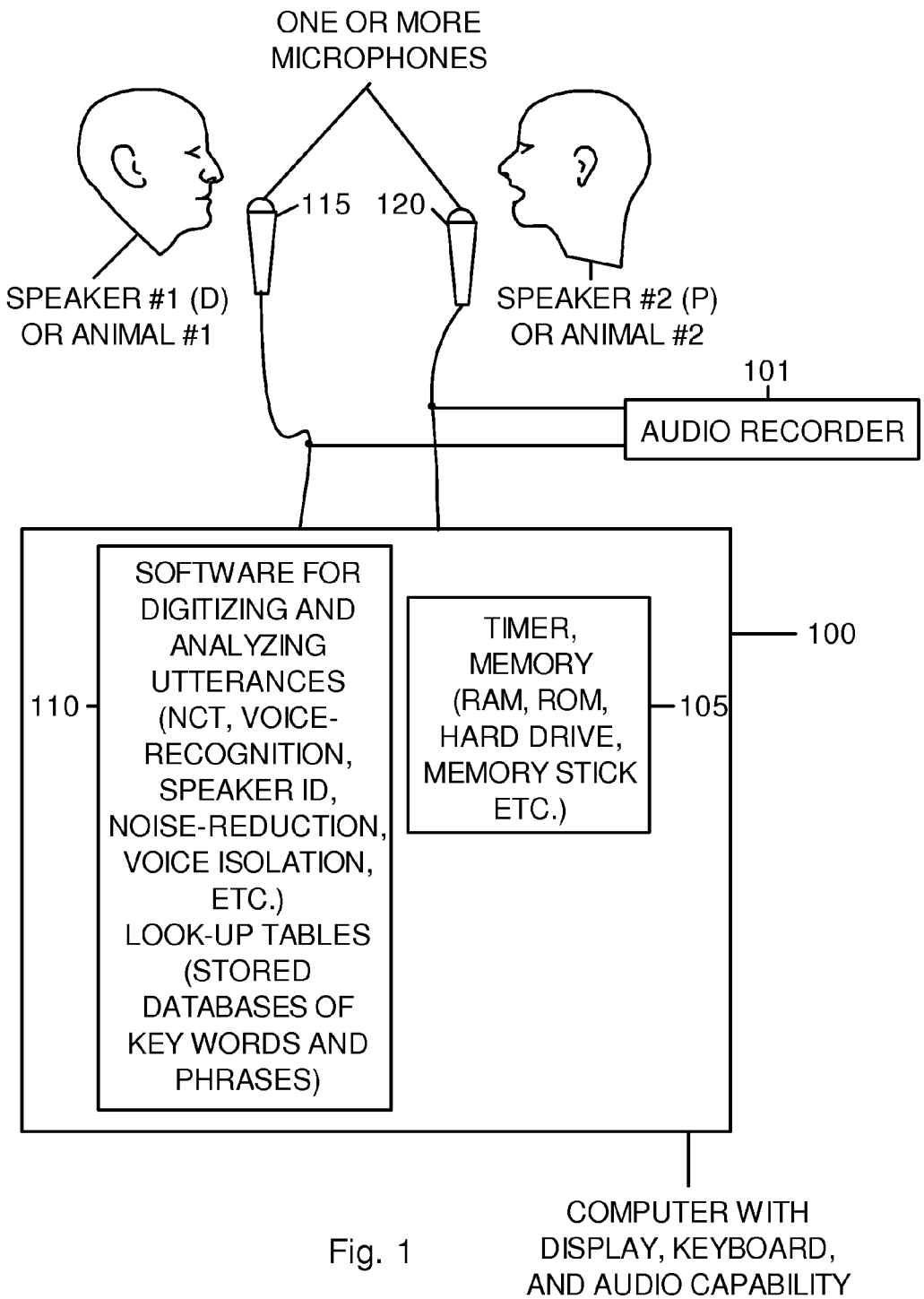
FIG. 1 is a block diagram showing an apparatus used in the present system of NCT analysis.

The following is a definition and explanation of the terms used in NCT.

Array. A series of consecutive NCT turns produced by one speaker and bounded by the NCT turns of another. Arrays help in the understanding of how turns are organized. The methods described below allow us to recognize arrays. This approach also allows the quantitative analysis of the distribution of turns. It provides a means for (1) comparing a conversation to a predetermined norm, and (2) making a comparison between two conversations.

In-breath. An in-breath is a point in a conversation when one stops talking to take a breath.

NCT. Natural Conversational Technology is a system for rapidly quantifying turn-taking interactions. NCT will evolve into a real time system. NCT covers a broad scope of conversational and interactional components, including the following:

Utterance: the verbal content of a turn, consisting of words and any other sounds produced, emitted or created by a speaker.

Adjacent turns or pairs of turns, i.e., two turns that commonly are related to one another, such as a question and answer Alternating turns: The turns that occur when speakers take turns, one at a time, with no overlap Concurrent turns: The turns that occur when two or more speakers talk at the same time Arrays of turns by one speaker: The turns that occur when a speaker takes multiple turns in a row, across turn-transition points Overlapping turns: Example: A speaker begins talking while another speaker is also talking and the speakers continuing talking at the same time. This is different from "Concurrent turns"; while means two or more speakers start speaking at the same time.

Pauses between turns: When no speaker says anything for a brief period of time, measured in tenths of seconds, i.e. 0.5.; sometimes referred to as a "Gap between turns"

In-breaths during a turn: When a speaking breaths in while talking, this is important as an in-breaths is a turn-transitional points Patterns and relationships of turns, turn-taking, turn transition points, alternating turns and arrays of turns Conversational events that may span one or more turns and turn-transition points How humans use their voice during a conversation, or their voice fluctuations during a turn How to measure turns, turn transitions, utterances, verbal actions that occur at different points in time during a conversation.

Pause. A pause is a silence in a conversation. A pause as short as 0.3 second is time enough for a person to take a turn in a conversation. This turn may be taken by any party to the conversation.

Question intonation. A question intonation is a point in the conversation when a speaker's voice marks the end of a question.

Sentence intonation. Sentence intonations are points in a conversation when a speaker's voice marks the end of a sentence.

Speaker change. A speaker change is a point in the conversation when some other party to the conversation does speak. Points in the conversation when speaker change does occur are points when turns (q.v.) are taken.

Turn. A point in time in one's talk when another may or does speak. Turn-taking is the fundamental organization of social interaction. Turn transition points are places in conversation when speaker change may or does occur. Turn transition points bound the fundamental conversational unit, the turn. Turns can be recognized by the following criteria, which themselves will now be defined.

Turn Taking. Turn-taking is the fundamental organization of social interaction. It marks the point in a conversation when speaker change occurs, and it marks points in social interactions when another does something.

Turn Transition Points A place in a conversation turn when speaker change may or does occur.

Vowel extension. The extension of a vowel sound, usually measured in increments of 0.25 second.

In the following discussions, the term "turn" represents a turn as defined in NCT, unless stated otherwise.

DESCRIPTION & OPERATION

First Embodiment—Parsing Conversations Into Turns

The present system uses conventional computer components, including a processor, memory storage devices for the processor, connected display devices, input, and output devices. These components are arranged in a computing environment, which includes at least computers remote file servers, computer servers, and memory storage devices. Each of these computing components is accessible by the processor via a communications network.

Present Capabilities of Speech Recognition Software

Speech recognition software available today is able to translate human speech into digital data. One program is sold under the trademark Dragon Speech Recognition Software by Nuance Communications of Burlington, Mass., USA. A user speaks into a microphone attached to a computer in which the software is operating. The computer then interprets the sounds and converts them into binary data for storage in a computer's memory (hard disk, RAM (random-access (better termed read-and-write) memory), ROM (read-only memory, etc.) and also converts them into words that appear on the computer's screen. A number of features presently available in speech recognition software make it amenable to use in various aspects of analyzing turns, either directly or with certain additions, as described below. Additional speech recognition software is described at the following site: http://en.wikipedia.org/wiki/Speaker_recognition.

Speech isolation and speech filtering software is presently available that eliminates the requirement of individual microphones for each speaker, allowing NCT to analyze video and other media from which conversations are recorded. Speech filtering software, such as that sold by Dartech, Inc., of Edina, Minn., USA, uses proprietary techniques to reduce or eliminate ambient noise in recordings. Speech isolation or speaker identification software, such as that sold by Recognition Technologies, Inc., of Yorktown Heights, N.Y., USA, uses proprietary techniques to train on characteristics of an individual's voice and can then attribute speech to individual speakers.

Turn Fundamentals

A closer look at the definition of a turn is required here. I.e. a turn is a point in time when the current speaker begins to speak, makes, produces, or forms an in-breath, a sentence intonation, a question intonation, a vowel extension, a pause for 0.3 second or greater, or a when an another participant to the conversation vocalizes a sound or a word." Note that applicant's definition begins with "A point in time . . . . " This is important as all conversational and interactional components occur at a specific point in time. A basic point of reference for human beings is time—not just any time, but a specific point in time, in the present. Human interactions are dynamic and cannot take place in the past or the future; they can only occur in present time and that time can be recorded.

EXAMPLE

Applying NCT to an Actual Conversation

Prior to describing the processing elements for NCT and their operation, I shall use an example to explain the concept of the turn and related elements that are the heart of the NCT method and process. I shall also show how the turn method of language analysis differs from prior-art methods.

The following is an excerpt of an actual conversation that was recorded and transcribed, with permission, between a doctor and a patient. The doctor is represented by "D" and the patient by "P". In this conversation neither the doctor (D) nor the patient (P) uses grammatical sentences to express themselves. Thus traditional linguistic approaches are not able to apply their analytical methods due to the absence of grammatical structures. Turn analysis, by contrast, is fully capable of analyzing this conversational exchange.

The following turn data contain the identity of the speaker, i.e., D or P. The times in parentheses indicate pauses in vocalization, measured to a precision of one-tenth second. In-breaths are indicated by the symbol, ".hh", and the length of the in-breath is approximated by the number of hhh's, with each "h" representing a pause of 0.01 second. The colons indicate that the preceding vowel sound was extended for a period of time. Sentence intonation is indicated by a period at the end of an utterance. Question intonation is indicated by a question mark at the end of an utterance. Speaker change is located in the transcript by a D to P transition or a P to D transition. In summary the turn data in this example comprise:

(1) Speaker change (D-P or P-D)
(2) Pauses (M·N seconds, where M is measured in seconds and N is measured in tenths of seconds)
(3) In-breath (.hhhh where each h=0.25 sec)
(4) Vowel extension (::: where each colon represents a 0.25 second extension of a vowel sound)
(5) Sentence intonation (.)
(6) Question intonation (?)

Example 1

(1) D: "Mary nice to meet you." (0.5 sec)
(2) D: "What could we do for you?"
(3) P: "we:::ll" (1 sec)
(4) P: .hh "um::the last I'd say three weeks" (0.5 sec)
(5) P: "I've had" (1 sec)
(6) P: "these" (0.3 sec)
(7) P: "really sharp pains down in this area of my abdomen"
(8) P: .hh "and they've" (0.5 sec)
(9) P: "they've been up in this area too=but not so much as down here"
(10) P: .hhh"and I've had a sharp pain under my left breast"
(11) D: "m'k" (i.e. "mm OK")

Analysis.

Lines 1 and 2 show speaker "D" taking two turns consecutively; the two turns are separated by a pause of 0.5 sec. Again, each turn is a point in time in one's talk when another may or does speak.

1. D: "Mary nice to meet you." (0.5 sec.)
2. D: "What could we do for you?"

Lines 3-10 show speaker "P" taking eight consecutive turns, in a row, serially produced:

3. P: "We:::ll" (1 sec.)
4. P: .hh "um::the last I'd say three weeks" (0.5 sec.)
5. P: "I've had" (1 sec.)
6. P: "the:se" (0.3 sec.)
7. P: "really sharp pains down in this area of my abdomen"
8. P: .hh "and they've" (0.5 sec.)
9. P: "they've been up in this area too=but not so much as down here"
10. P: .hhh "and I've had a sharp pain under my left breast"
11. D: "m'k"

Lines 2 to 3 show a D-P speaker change, and lines 10-11 show a P-D speaker change.

All five turn recognition criteria are present and identifiable from this transcript portion. Pauses are identified by parentheses. The length of the pauses is measured in tenths of a second and located within the parentheses. In-breaths are indicated by the symbol, ".hh", and the length of the in-breath is approximated by the number of hhh's. Sentence intonation is indicated by a period at the end of an utterance. Question intonation is indicated by a question mark at the end of an utterance. Speaker change is located in the transcript by a D to P transition or a P to D transition.

Additional Analysis and Identifying an Array.

The first turn from conversational example (above) is:

D: "Mary nice to meet you."

This turn is assigned to speaker D as D was the first participant to speak. D spoke at an even pace. The intonation was steady; there was no sharp rising of falling of the voice. Also the spacing between words is "normal" for the social context, as there are no gaps or overlaps in the first five words of this turn. The recording of this conversation makes it clear that D ends with the last word "you" with an even intonation, which is often referred to as a Sentence Intonation, indicating that D has completed the utterance that makes up the first turn.

This turn ended with a sentence intonation indicating turn completion and a place where speaker P could take a turn to speak; however, P did not. This first turn may also be qualified as the beginning of a "Greeting sequence" within the social context in which it was spoken.

The second conversational event is a pause, or silence, of 0.5 second, also an indicator that speaker P could have spoken; or perhaps that speaker D was waiting, providing a place in time for speaker P to take a turn to speak. Speaker P does not speak at two points in time within the interaction, i.e., at the immediate end of D's first turn or during the pause. Since there is a place in time for a speaker to take a turn, the next utterance by either speaker constitutes a second turn. This contrasts with traditional linguistic analysis, which would only define one turn in comparison to the two turns defined by NCT's methodology.

NCT's methodology measures all conversational events, and so far the following two have occurred: (1) a Turn and (2) a Pause. We have two conversational events that are transcribed as follows:

D: "Mary nice to meet you." (Event 1, end of a Turn: where a turn-transition is possible) (0.5 sec) (Event 2, a Pause: a place in time where a turn can be taken by D or P).

The second turn is then taken by speaker D, the 2nd turn in a row for D:

D: "Mary nice to meet you." (Event 1)

(0.5 sec) (Event 2)

D: "What could we do for you?" (Event 3)

The analysis quickly expands, providing more data for analysis. So far three conversational events have been produced, two turns and one pause. Both turns are taken by speaker D.

Now we have what is termed "an array" as speaker D has taken two turns in a row. It is the relationship between turns that allows for the recognition of an array. Arrays are places in a conversation where a participant takes two or more turns in a row.

Continuing with the analysis, NCT has identified three events made up of two turns, one array and one pause. Speaker D taking the first turn, (2) a pause of 0.5 second, (3) speaker D takes the second turn creating a two turn array.

Turn two has similar properties to turn one except it ends with a question intonation, signifying another place where speaker P can take a turn, or where a next turn can be taken by either participant. From a cultural point of view, it may also indicate a place where D "expects" P to take a turn, as it is appropriate for a participant to provide an answer to a question from the current speaker.

NCT will also record the time, or how long, it takes to produce each turn. In some embodiments, this is a useful measure for a computer to store in order to simulate the rate, or pace, in which the words, or vocalization, are uttered or spoken. Pacing may have cultural or other contextual significance.

Continuing the Sample Analysis.

3. P: we:::ll (1 sec.)

4. P: .hh um::the last I'd say three weeks.

(0.5 sec.)

5. P: I've had (1 sec.)

6. P: the :: se (0.3 sec)

7. P: really sharp pains down in this area of my abdomen

8. P: .hh and they've (0.5 sec.)

9. P: they've been up in this area too=but not so much as down here

10. P: .hhh and I've had a sharp pain under my left breast

Turn three is taken by speaker P, and it comes right after turn two, meaning there is no pause or overlap in the talk between speaker D and P at this point in time during the conversational exchange.

Analyzing Turn Three.

Turn three is taken by speaker P who vocalized the unit of sound "we:::ll". In typical linguistic analysis this sound would be represented by the word "well"; however, listening carefully to the recording reveals that is not what speaker P actually vocalized. Speaker P vocalized the sound "we:::ll" where the colon (:) indicates that the vowel sound "e" was extend for a period of time. This act extends the length of the turn and serves as a place holder for the turn. Extending a sound serves many functions in conversation and interaction is general, one of which is to give the speaker time to think while holding the floor and preserving their right to the turn itself. A computer would need to vocalize the sound in a similar fashion to capture the conversational profile of speaker P accurately.

From the point of view of a person skilled linguistic analysis, we observe that speaker P used this conversational vocalization technique of sound extension many times, starting at turn 3 and continuing until speaker transition occurs at turn 10.

A detailed analysis of turns 3 to 10 would be voluminous, so let's look at a few salient points from a turn-taking point of view. Note that the sample transcript provides only numbers for the turns and not other conservational events such as pauses, arrays, turn transitions along with the many conversational categories such as greetings, complements, Question-Answer sequence, and so on. The transcript could have included numbers and markers for these additional events and components; however, for the sake of brevity they were omitted. However, one skilled in this discipline would comprehend how to build and structure that alternative transcript.

Turns 3 to 10—Salient Points.

Three turn-recognition criteria are present and identifiable from this transcript portion. Pauses are identified by parenthesis. The length of the pauses is measured in tenths of a second and located within the parenthesis. In-breaths are indicated by the symbol, ".hh", and the length of the in-breath is approximated by the number of hhh's. Sentence intonation is indicated by a period at the end of an utterance.

Two sounds that run into one another as they are almost spoken as one sound are indicated by equal signs.

Turns 3-11 show Speaker "P" taking eight consecutive turns, in a row, serially generated.

Here, eight consecutive turns, taken in a row by one speaker, constitutes an array of some complexity. It is not uncommon in western culture for speakers to generate five turn arrays; however, an eight—turn array may be considered by some to be "outside the norm" and an indicator of special conditions or circumstances.

There are numerous places where speaker D could have spoken (taken a turn), yet did not do so. Such places are (1) Pauses, (2) In-breaths, and (3) A turn taken at will, that may have overlapped the current speaker's talking. Note: to speak while another is talking may have a cultural implication, sometime called "interrupting"; however, it would still have been considered a turn by D.

For a computer to generate a conversational array that accurately reproduces the one above, it must be taught how to construct an eight-turn sequence. Again, this refers back to the desirability of capturing vocalization accurately, as it plays a role in accomplishing this conversational phenomenon, an eight turn array. If speaker P had spoken in any other manner, produced any sound, the array would have ended much earlier, reducing its size and its analytical attributes.

The last turn of the sample is turn 11, an example of turn transition, as the turn is taken by speaker D. Still more in-depth analysis will provide the information a computer would need to reproduce this conversational interaction so that a typical listener would not be able to tell if it was a computer or human speaking.

Comparison of Turns Analysis to a Traditional Linguistics Approach

Traditional linguistics would represent the conversation between the doctor and the patient as follows:
(1) D: "Mary nice to meet you. What could we do for you?"
(2) P: "The last I'd say three weeks, I've had these really sharp pains down in this area of my abdomen and they've been up in this area too but not so much as down here and I've had a sharp pain under my left breast."
(3) D: "OK."

Traditional linguistics approaches reduce the number of turns in the sample conversation from eleven to three. As traditional linguists do not recognize the turn as a unit of analysis, their transcripts would show only that Mary was asked a question by the doctor, she responded, and the doctor acknowledged her response. There is no recognizable grammatical structure as neither speaker's talk contains a grammatical sentence.

As one can see, NCT's analysis quickly becomes robust, continuously measuring and categorizing all interactional events that take place during a conversation. The totality of information plays a critical role in the eventual computer generation of human conversation that is natural and identical to the manner in which human beings construct conversations. NCT's analysis takes into account all events that occur during a conversation.

NCT methods can be applied to all conversational activities, events, and categories. One reason for its universal applicability is that most, if not all, human beings engage in some form of conversation on a regular basis. The criteria for recognizing a turn are also universal as all humans must breathe to survive, so in-breaths often occur while speaking and mark points in time when a turn transition may occur.

It does not matter what kind of sound is uttered; if a sound occurs during a conversation in person or at a distance, as on a phone, it is recognized as a turn by NCT. Turn, turn-taking, and turn transitions may be culturally bound; however, they all are within the domain of NCT. Note that out-breaths may in some cases be important conversation markers; however, none were marked in the example. In fact, any noise one makes while breathing, coughing, sneezing, laughing, crying, snorting, sighing, mimicking, yelling, and the like, may occur at a specific time and place within a conversation. Such noises can be marked and are relevant to analysis, reproduction, and generation of entire new conversational sequences based on the NCT model.

I have only briefly touched upon conversational categories, such as greeting; however, there are many more. A brief list includes: stories, instructional lists, compliments, insults, jokes, question-answer sequences, laughter and crying sequences, complaints, shouting, yelling, embarrassment and apologies to name a few.

I have also not addressed all the non-verbal gesturing and posturing that goes on during a face-to-face conversation that adds meaning and effects turn taking patterns. NCT can account for all verbal and non-verbal actions by layering them upon turn taking sequences.

One conclusion here is that existing formal linguistic approaches do not have the ability to recognize the natural occurring building blocks of human conversation. NCT is a real time methodology designed to examine, analyze, record, and dynamically generate natural occurring conversational interactions between human beings and intelligent devices. Conversation is one of the primary ways human beings interact within social settings. NCT is designed to quantitatively analyze the distribution and patterns of turns and arrays. By identifying conversation patterns unique to individuals, a computer can then be programmed to simulate that communication style.

The turn analysis of the conversation between a doctor and patient discussed above contained six salient features: speaker change, pauses, in-breath, vowel extension, sentence intonation, and question intonation. The speech-recognition software above creates profiles for individual users; thus it can recognize speaker changes. The software parses individual words contained in a stream of words; therefore it also has sufficient data to quantify pauses. In-breaths create a unique characteristic sound that is not a word and would ordinarily be dismissed by speech recognition software; however sufficient data exists to recognize them as unique words and to quantify their length. Vowel extensions cause variations in the pronunciation of words. These are recognized as alternate pronunciations of a particular word and their length can be quantified. A sentence intonation is characterized by a drop in the frequency of the last word spoken followed by a pause. A question intonation is characterized by a rise in the frequency of the last word spoken followed by a pause and often a change of speaker. These two characteristics are easily quantified and thus recognized. Some of these salient features apply principally to the English language. Other languages may have other features which can be similarly quantified.

Additional Capabilities Available to Users of Speech-Recognition Software

Certain aspects of interpersonal interchange are variable. For example, a speaker asking a question such as, "How are you?" normally raises the pitch of their voice as they utter the last word. However, a speaker asking, "How are you doing today?" may end the question with a falling or level pitch.

For purposes of turn analysis, a look-up program is added to speech-recognition software. This program accesses and searches a database of keywords and standard phrases and recognizes them as pre-defined Conversational Events (described in detail below). For example, the following are examples of questions:
How are you?
Have you eaten?
Are you feeling well?
Hi Jane; how was your weekend?

Each of these phrases contains one or more key words that are normally associated with a question, i.e., how, have, are you, how was, and so forth.

The look-up program searches for key words like "how", "have", "are you", "how was", and so forth in a turn. Then it examines the turn in detail, comparing the words in the turn with a collection of standard phrases in order to determine whether the turn was a question or a statement.

FIG. 1—Block Diagram of NCT System

FIG. 1 is a block diagram that shows the essential parts of an NCT system that can analyze a conversation on the basis of turns. A computer 100 has a memory 105 and software 110. Memory 105 includes at least one RAM, one ROM, a hard drive, a memory stick or thumb drive, etc. Software 110 includes an operating system for computer 100 and applications including known speech recognition software, known speaker-identification software, NCT software (described below), and the like. At least one microphone 115, connected to computer 100, is used to capture the vocalizations of at least one speaker, i.e., speaker #1 (doctor D in the example above). For a two-way conversation involving a second speaker, i.e., speaker #2 (patient P in the example above) a second microphone 120 is also connected to computer 100. Alternatively, instead of a second microphone, speaker identification software can be used to identify which speaker talks based on the characteristics of their voice, e.g. timber, pitch, rate, etc. Instead of human conversation, animal conversation can be analyzed on the basis of turns when one or more sounds are followed by an in-breath or pause followed by more sounds. It does not matter whether vocal sounds are made by animals or humans; it is the vocalization that matters, not the source of the vocalization.

An optional audio recorder 101 captures a conversation in memory such as audio tape, disk, or semiconductor memory for later playback and analysis.

As the two speakers converse, their vocalizations are captured and interpreted by the speech recognition software in software unit 110 into a data stream comprising words, sounds such as in-breaths, and pauses. An example of a data stream is provided in the next paragraph.

the Data Stream as Generated by Speech Recognition Software

In the case of the above example, the speech recognition software delivers the following stream of data (in the usual coded, machine recognizable form) to the NCT program. If there were significant background noise, noise reduction software could be used ahead of the speech recognition software to improve the accuracy of the speech recognition software. If the two speakers were sharing a single microphone, speaker identification software would be used to separate and attribute utterances to each speaker. If each speaker has a microphone, then utterances made by each speaker are already separate and are attributed to each speaker in the NCT software (block 240, below).

[Start] [speaker 1] mary nice to meet you [0.5 sec] what could we do for you? [speaker 2] we:::ll [1.0 sec] .hh um [1.0 sec] the last i would say three weeks [0.5 sec] i've had [1.0 sec] the:se [0.3 sec] really sharp pains down in this area of my abdomen .hh and they've [0.5 sec] they've been up in this area too=but not so much as down here .hhh and i've had a sharp pain under my left breast [speaker 1] m'k [End]

Figure 2:
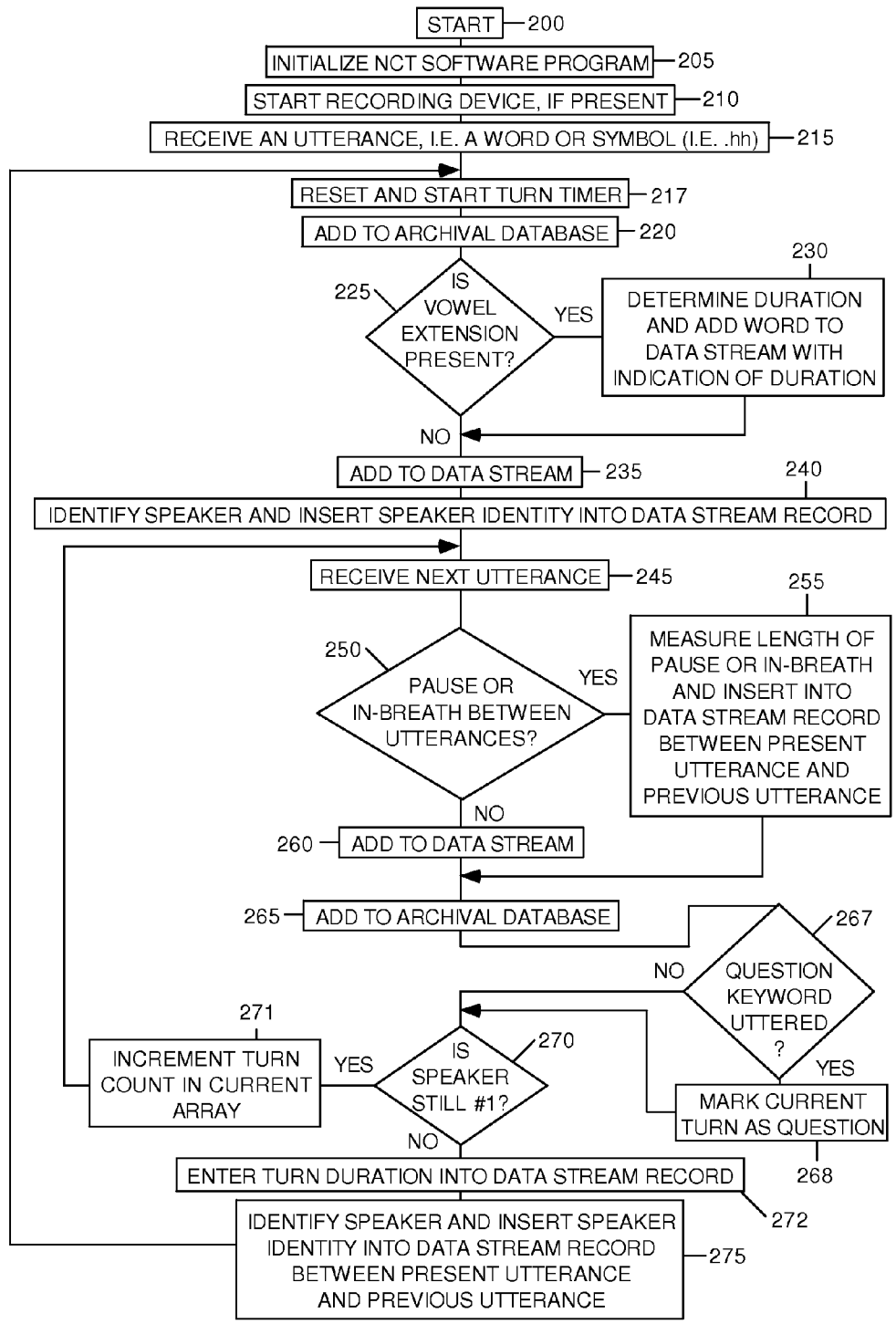
FIG. 2 is a flow chart showing the steps in one aspect of an NCT software algorithm.

Flowchart Showing NCT Applied to the Above Example—FIG. 2.

FIG. 2 is a flowchart showing algorithmically how the above data stream that is generated by the speech recognition software is parsed or analyzed by the NCT unit in block 110 (FIG. 1) on an utterance-by-utterance basis. This system has two principal goals: (1) to provide analytical data for academic use, and (2) to show the contents of a conversation with a view toward mimicking these contents in a computerized voice recognition and response system, i.e., making a better voice-recognition system than was available in the past.

At the start (block 200) all variables in the NCT processor are initialized (block 205) in well-known fashion. Initializing means setting all timers to zero and all variables to a predetermined value, such as zero. A recording device for recording the raw audio of the conversation is turned ON (block 210). Such a recording device is useful during later analysis of a conversation in which one or the other speaker occasionally speaks softly, has a foreign language accent, and the like.

The NCT system receives an utterance by a first speaker (block 215) in digital form from speech-recognition software operating in computer 100, resets, and starts a turn timer (block 217), and saves the utterance in digital form to an archival database file (block 220).

The purpose of a turn timer is to capture the time metric—the time span or length of time it take to utter a turn. NCT needs to capture exactly how long a person speaks, in tenth of seconds, perhaps hundredth of seconds. The eventual function or purpose is to reproduce the conversation exactly, or generate a similar conversation that mimics an original. It also has an analytical function, that is, analyzing 1) Turn-transitions, 2) Vowel extensions, 3) Laughter (hahaha), 4) Sighs (awwww), and 5) In-breaths. All of these types of utterances can happen very quickly in a conversational situation. These utterances are very short, yet are most important for analysis, comparison, and reproduction of like conversational patterns. Every utterance has a timing metric associated with it. The timing metric measured the time to produce that utterance. The length of time of each utterance is stored in the data stream record and the archival database.

For example in political debates between candidates, speakers vie for a turn to express their ideas (also known as competing for the floor to speak) within two-minute allotments. These allotments result in rapid turn-transition actions. The candidates use a variety of techniques to get the floor to speak, namely 1) raising the pitch and amplitude of the voice higher and higher, and 2) continuing to talk at the same time until the other "gives up" and surrenders the floor. Thus fighting for a turn becomes very competitive, especially when a clock is running to limit the exchange to a finite amount of time.

This has been referred to as an "economy of turns". There are only so many turns available in two minutes, and each turn has a value, as seen by the candidates requesting their turn to speak to the moderator. Although a participant can interrupt the opponent, there is real value in having a turn and the floor to speak at the same time. This means the other speaker has stopped talking and the current speaker can be heard by the audience, and has time to take several turns in a row (an array of turns) to express an idea without being interrupted. Audiences cannot clearly hear or make sense of the conversation message or content of an utterance during concurrent speaking (referred to as "overlap").

Timing becomes critical for NCT to analyze and interact as a human in a competitive debate situation. Each and every utterance has a timing metric associated with it. I.e., the duration of each utterance is measured to a precision of hundredths of a second.

NCT is capable of analyzing debates and eventually participating in a debate by using the data it has stored to mimic one of the candidates.

The system then tests the data stream to see if a vowel extension is present (block 225) in a word. If a vowel extension (example "we:::ll") is present, the NCT software determines the duration of the extension and adds the word to the data stream with an indication of the duration of the extension (block 230). If no vowel extension is present, the current utterance is added to the data stream (block 235).

Next, the speaker is identified either by the speaker identification software or the microphone used, and the speaker's identity is entered into the data stream record (block 240). In one embodiment the speaker is identified by a microphone used only by that speaker; in this case then all utterances received by that microphone are attributed to that speaker. In another embodiment speaker identification software is used, in which case the speaker is identified by the sounds of their voice, e.g. timber, pitch, etc.

The next utterance is received (block 245) and the NCT software tests to see if there was either a pause or an in-breath between the previous two utterances. If so, the NCT software measures the length of time of the pause or in-breath and inserts this information into the data stream record between the present utterance and the previous utterance (block 255). If not, the utterance is simply added to the data stream (block 260) and to the archival data base (265).

The NCT software tests to see if the current utterance contains a keyword normally contained in a question (block 267). If not, the utterance is marked as a sentence and the program continues on to block 270. If a question keyword is present, the software marks the current turn as a question (block 268) and then continues on to block 270. Keywords normally associated with questions include "how", "when", "why", "what", "where", and the like.

Next, the NCT software tests to see if the previous utterance was made by speaker #1 (block 270). Speaker identification is determined in block 270 using one of the two methods discussed supra: input from separate microphones, with one microphone associated with each speaker, or speaker identification software that uses the characteristics of a person's voice to tell them apart. If the result of the test is true, i.e. "YES", control reverts to block 245 and data collection continues with the data stream record noting the start of an array. If not, the current speaker is identified, the duration of the turn is entered into the data stream record (block 272), and the speaker's identity is inserted into the data stream between the present utterance and the previous utterance (block 275). Note the turn duration comprises the sum of all utterances by a speaker, including turn arrays.

An utterance becomes a turn at the point in time when a turn transition occurs, such as a pause, sentence, question intonation, or when another speaker utters something. Turn transition points can be places of competition such as seen in Presidential debates, where each debater vies for a turn to talk. Vying back and forth usually comprises very short, quick, utterances or turns until one debater gives up and the other debater the floor and can continue with a longer utterance.

This process continues until all utterances in the conversation are recorded and tabulated. At that point, the capture of turn data is complete. All data in the turns archival database and the data stream record are retrievable for later use and analysis.

Turns Archival Database Contents

When the conversation is finished, the contents of the turns archival database are as follows:
[Start] [speaker 1] mary nice to meet you [0.5 sec] what could we do for you? {speaker 1 turn+array duration=3 sec} [speaker 2] we:::ll [1.0 sec] .hh um [1.0 sec] the last i would say three weeks [0.5 sec] i've had [1.0 sec] the:se [0.3 sec] really sharp pains down in this area of my abdomen .hh and they've [0.5 sec] they've been up in this area too=but not so much as down here .hhh and i've had a sharp pain under my left breast. {speaker 2 turn+array duration=20 sec} [speaker 1] m'k {speaker 1 turn+array duration=1 sec} [End]

The curly brackets contain the turn duration, including arrays of turns, attributed to each speaker and entered into the data stream record (block 272 of FIG. 2). The square brackets indicate the identity of the speaker and the duration of pauses and in-breaths between utterances for that speaker during a turn.

Turns.

The data stream is analyzed to detect turns, utterances, sentences and questions, arrays, and turn transitions. The data stream is first parsed, i.e., categorized and tabulated, into turns by the NCT system. Speaker changes, pauses, and in-breaths are turn-changing points. After this categorization and tabulation of turns, the result is:

(1) [speaker 1] mary nice to meet you [0.5 sec]
(2) what could we do for you {speaker 1 turn+array duration=3 sec}
(3) [speaker 2] we:::ll [1.0 sec]
(4) .hh um the last i would say three weeks [0.5 sec]
(5) i've had [1.0 sec]
(6) the:se [0.3 sec]
(7) really sharp pains down in this area of my abdomen .hh
(8) and they've [0.5 sec]
(9) they've been up in this area too=but not so much as down here .hhh
(10) and i've had a sharp pain under my left breast. {speaker 2 turn+array duration=20 sec}
(11) [speaker 1] m'k. {speaker 1 turn+array duration=1 sec}

From this turn analysis, many other aspects of the conversation can be recognized and categorized. For example, the following components of a conversation are discerned from the above list as follows:

Utterances.

The number of utterances is simply the word count of the turns archive database, including in-breaths (.hh).

Sentences and Questions.

The ends of sentences are determined by pauses. Question marks are determined by keyword analysis.

Arrays.

Arrays of turns are extracted from the turns archive database. Arrays of turns are created when the current speaker continues to talk, even though turn transition points arise and no other participant speaks. I.e., the speaker takes multiple turns in a row and creates an array.

Turn Transitions.

Turn transitions are the points at which speaker change occurs, frequently marked by place where pauses or in-breaths occur; however, turn transition are not limited to these markers as a participant can speak at any time; resulting in a turn transition.

User Intervention Improves NCT

The turns archive database is editable. This permits correction of utterances incorrectly captured by the speech recognition software. For example, the VR software may interpret "I'd" as "eyed". Upon noting this, an operator simply opens the turns archive database file and corrects the entry. After that is done, the NCT software parses the conversation again using the correct data.

Many other aspects of conversation can be analyzed. For example, video analysis captures visual cues such as facial expressions, shrugs, and other body movements that individuals use to indicate possible turn transitions and arrays.

NCT rapidly and efficiently accumulates data representative of the interchange of information between individuals. In the complete conversation between the doctor and patient, a portion of which was analyzed above, the doctor actually took 187 turns, the patient took 159 turns, there were 186 speaker transitions (D-P or P-D), and 125 arrays. The total turn count is 346.

The totals:
- 80—two turn arrays
- 30—three turn arrays
- 10—five turn arrays
- 4—6 turn arrays
- 1—8 turn array We also extract the turn position of each array. For example at turn 3, an eight-turn array is assigned to speaker P (the patient). Next, the time required to speak each array is tabulated, the number of possible turn-transition types in each array (for example in the 80 two-turn arrays, 60 of the arrays had a pause of 0.3 sec, 10 had a pause of 0.5 second. 10 had an in-breath of .hhh seconds), and so on.

This is an example of the extensive metrics that can be extracted for analytic purposes for each turn, array, and turn transition. This information is useful in at least two ways. It enables voice recognition software to better understand utterances by humans and that can result in improved voice-recognition software. It also provides guidance for designing computer response algorithms, enabling them to provide reasoned responses, instead of only pre-defined ones.

NCT Analogies

The development of modern computers provides the following interesting analogy to NCT.

Consider the history of computer design and how the majority of computers are based on a "bits and bytes" architecture. A bit is short for a binary digit which is the smallest, or most fundament unit of information, on a computer. A bit can be either Off or On (0 or 1). Combining bits into bytes results in more robust and interesting information.

The analogy here is that bits are analogous to individual turns and bytes are analogous to arrays of turns. The analogy is more explicit in that a byte can have alternating bits On and OFF, like turns that are A, B, A, B and a byte can have multiple bits ON or OFF like an array of turns, such as AAAA or BBBB.

This analogy points to the power of a fundamental unit of analysis that evolves into a very sophisticated system with thousands of practical applications. NCT is also designed around a fundamental unit of analysis, analogous to that used by modern computers, that has the potential to evolve into a very powerful system for analyzing human conversational interactions with thousands of practical applications.

Practical Applications of NCT

NCT can operate at the most basic, fundamental, level. It collects and processes the raw data of human conversational interactions and can be viewed as an operating system of technology to investigate human conversational interaction.

NCT can be viewed as an adjunct to grammatical sentence diagramming taught from grammar through high schools. As mentioned, phrase-structure grammar identifies nouns, verbs, adjectives, adverbs, and prepositions in their proper order in complete sentences. Transformational grammar analyzes the relationships among the elements of a sentence and expresses these relationships through a number of rules, e.g. comparing active with passive sentences. While these methods deconstruct sentences in order for the student to understand proper sentence structure, they do not reflect what happens in a conversation between two or more people. In normal, colloquial conversational speech one or both speakers often exchange incomplete sentences without losing comprehension of the subject. This is because the conversation has a context that relates to the current topic. Standard grammatical methods cannot properly analyze such exchanges. Analysis of conversations through the principles of NCT does not depend upon complete sentences, yet it does provide a new analytical tool for understanding conversational interchanges. NCT is a new tool that can be used to teach the principles of language and interpersonal communication to children and obtunded people. It shows the value of "claiming the floor", i.e., dominating a conversation by uttering a plurality of arrays, or "releasing the floor", i.e., letting another speak, through the use of arrays and turns. With NCT, a student can develop speaking skills that can guide and even manipulate conversations, while prior-art grammatical analysis doesn't teach such skills.

NCT opens the door for the development of advanced, interactive, communication systems, for example:

1. NCT can provide an interactive voice answering, calling system or customer support system, i.e., one that is not limited to existing technologies and only capable of dealing with single sentence or phrases. Imagine an advanced interactive system capable of having a conversation with the person on the phone just like a human being. This system will have the capacity to process information that can only be expressed through an array of turns and provide equally robust responses, thereby eliminating redundancy, frustration and completing complex tasks in an efficient manner.
2. NCT enables the development of new products that compete with voice-recognition and voice-assisted products, such as Siri by Apple Computer. Currently systems such as Siri do not have the intelligence to engage in a conversation like a human being. Image a Siri like system that can interact like a human being, participate in a conversational interaction and processing complex array based information. A NCT based designed will enable the device to interact with the human owner is a very sophisticated manner, increasing the usefulness of the information it provides.
3. An intelligent avatar (a graphical representation of a user or a user's alter ego or character) can be built using NCT for use by a social media company like Facebook. A NCT based avatar can carry on an intelligent conversation, taking turns appropriately, understanding how to listen is a way humans listen, getting to know the participants and becoming a "friend".
4. An advanced profiling system based on turn-taking patterns can very precisely identify humans regardless of gender, race, culture, or age. NCT based Profiling systems can be used to as a safe guard against imposters in much more accurate manner.
5. NCT enables the development of advanced speech-recognition systems for communication devices that understand how to take turns, tell stories and tell jokes, provide array based complex instructions and engage their users in ways not possible today.
6. Systems using NCT can be developed for the blind that allow them to have a conversation, ask questions and provide complex array-based descriptions of their circumstances to an automated device.
7. NCT-based systems can be provided for stroke victims and others that need to relearn how to talk and take turns in a conversation. A NCT-based system will be invaluable for people that need to recreate their social conversational abilities.
8. With NCT, advanced car safety and GPS systems can converse with the driver in an on-going manner in hazardous situation to reduce risk and have the ability to processes complex, array-based information from the driver about their experience.
9. NCT provides new opportunities for technology companies such Google, Microsoft, Apple, Amazon, Samsung, Intel, and others who are all looking for an advantage, a revolutionary product, that is capable of interacting with their customers like a human being to create a wide range of desirable products and devices in which their users and have a real life conversation and interaction.
10. Game companies will find many uses for NCT. Imagine interacting with characters in a game, having a real life conversation, talking back and forth, making suggestions and influencing game outcomes verbally. A NCT-based computer game system will indeed be revolutionary and exciting.
11. Robotics manufacturers will also find many uses for NCT. NCT based robotic systems will enable robots to interaction with humans in ways only imagined. NCT will provide robotic systems the ability to engage in conversational interactions just like a human being. Like "Star Trek" coming to life.

Other practical applications and benefits of an NCT-based system will be envisioned by those skilled in the art. The following example shows the use of NCT in teaching languages.

NCT as a Teaching Tool.

NCT is used as a teaching tool that helps people understand the flow of information between or among speakers. For example in his website Timmermeyer, supra, shows a technique for teaching English as a second language. In his "Introduction Game", Timmermeyer recommends that the teacher have the students stand in a circle. The teacher stands in the center of the circle and practices the following greeting, with the students repeating afterward:

"Hello" ("Hello") "My name is (Teacher)." ("My name is (Student).") "Nice to meet you." ("Nice to meet you, too.) The conversation is completed with a handshake.

The teacher(s) should emphasize at this point that "Nice to meet you, too" is only used to respond to "Nice to meet you."

In order to save time, this greeting sequence can first be conducted by a teacher and a teacher's aide in order to demonstrate the proper timing of sentences in the greeting.

An NCT analysis of the above exchange is:
Teacher: "Hello."
(1.0 sec pause or in-breath)
Student: "Hello."
(0.3 sec pause)
Teacher: "My name is (Teacher).
(0.3 sec pause)
"You may call me (Teacher's proper form of address)."
(1 sec pause)
Student: "My name is (Student)."
(0.3 sec pause)
Teacher: "Nice to meet you."
(1.0 sec pause)
Student: "Nice to meet you, too."
The student is shown the NCT analysis and that there are 6 turns. At one point, the teacher took an array of two turns in a row. The teacher explains, in the student's own language if necessary, that this demonstrates the proper and polite use of an array of turns in a local setting, i.e., the city and state in which the conversation takes place. From this NCT analysis, the student learns the proper timing of each turn. It demonstrates how an everyday English speaker would construct this greeting in such a way that people in similar social contexts, city and states, would understand, recognize, and perceive this event as a "polite greeting". If the turns were taken differently, the person may be identified as a "foreigner" or incompetent; how we take turns, how we interact, is a signature of our intelligence and cultural belonging; part of our socialization. The student can then go on to listen to and understand other examples of greetings that have been previously recorded and stored in the NCT Archival Database.

NCT as a Forensic Tool

Forensic linguistics is the application of linguistic knowledge, methods and insights to the forensic context of law, language, crime investigation, trial, and judicial procedure. (Definition from Wikepedia—http://en.wikipedia.org/wiki/Forensic_linguistics)

Forensic linguists rely on the existence of relationships between a person's linguistic abilities and their identity. Forensic linguists try to recognize a person's writing style by analyzing syntactic and other linguistic patterns.

Forensic linguists use pieces of text or excerpts from tape and video recordings to evaluate and analyze meaning from the point of view of a specific social context. They are often used by expert witnesses in court room settings to provide testimony, instructions and logic to interpret and show relationships between a person's email, text messages, recorded phone calls or taped conversations, in an effort to profile or identify the person as a possible crime suspect.

In summary, forensic linguistics analyze spoken and written data using linguistic tools to help identify a specific person and differentiate one person from another.

NCT can be used as a tool in Forensic Linguists as it is specifically designed to analyze natural occurring conversations where linguists must adapt their tools to work with conversations. It is very important to remember that linguistics was not originally developed to analyze natural occurring conversational exchanges. Linguistics was developed to work with written text, specifically grammatical sentences.

NCT adds precision and completeness to the analysis of transcripts and recorded conversations. NCT achieve this precision and completeness by identifying an individual's conversational turn-taking pattern.

NCT and its turn-taking pattern technology can be used to help identify and profile specific individuals. All NCT requires is a sampling of a person's conversation in order to create an initial turn-taking pattern. NCT can do turn-taking profiling of any human being.

A human being can intentionally change how they look, move their bodies and the sound of their voice, yet I believe that it is next to impossible to change how one takes turns in a conversation, that is, their turn-taking pattern. One's patterns are not cognitive but rather an unconscious, almost reflexive behavior. This is what makes NCT's turn-taking patterns a powerful identification tool.

Examples of how NCT can be Used by Criminologist.

The above-cited article, "Words on Trial" makes it clear that context and the location of pauses is crucial when creating transcripts and interpreting a conversation. In one example, forensic linguist Roger Shuy shows that the position of a pause changed the meaning of the tape recorded conversational segment. NCT also considers pauses as an important conversational marker that influences turn-taking patterns and effects subsequent turn-taking patterns.

The following is from the article "Words On Trial" by Jack Hitt:

"In a bribery trial in the nineteen-eighties, two Nevada brothel commissioners were caught on tape in a crucial exchange. When they were offered a bribe, one turned to the other and, according to the police transcript, said, "I would take a bribe, wouldn't you?" Shuy analyzed the tape and, on the stand, testified that the defendant had actually said the opposite: "I wouldn't take a bribe, would you?" The tape was scratchy. Moreover, in conversational speech, the "n't" of a contraction is barely vocalized. It was hard to hear—or, rather, easy to hear what the listener was primed to hear. But two facts were indisputable, Shuy noted: both versions of the sentence had exactly eight syllables, and the pause fell just before the last two syllables. Thus, Shuy testified, only one reading of the sentence made sense: "I wouldn't take a bribe, would you?"

The trial resulted in a hung jury"

Taking this example, NCT adds precision and completeness in the following ways.

If the police had use NCT to create the transcript it would look much different, closer to Shuy's analysis.

NCT's voice filtering software would have removed the scratchiness of the tape and would have captured the "n't" of the word "wouldn't."

NCT turn-taking tabulation technology would have identified the exact position and duration of the pause and created a new turn immediately after the pause.

NCT voice isolation software would have identified the speaker's voice and assigned the two turns to that one speaker, thus creating a two turn array.

Comparing the Transcripts.

Police transcript: "I would take a bribe, wouldn't you?"

Shuy's analysis of the tape: "I wouldn't take a bribe, would you?"

NCT's analysis of the tape, using turn-taking and voice filtering and isolation software:

A. I wouldn't take a bribe (Turn 1)
   (Pause)
A. would you? (Turn 2)

The police and Shuy's transcripts are presented in a linguistic sentence format. NCT's transcript is presented in a conversational analysis turn-taking format. The two formats are very different.

NCT objectively parses the sounds, and tabulates two turns, neither of them are complete sentences. NCT provides a very different organization of the words uttered by the commissioner. Instead of dealing with one sentence comprise of eight syllables, NCT provides two turns, where the first turn has six syllables, the second turn two syllables. Turn analysis provides shorter segments and clearly locates the key word "would" as the first word of the second turn.

The issue here is that, for the most part, people do not talk in sentences; however, without access to the tape recording, it is impossible to know how the speaker uttered the words. Did the commissioner's speech comprise a sentence? Were there any vowel extensions? Did his voice rise of fall as part of any one spoken word? Were any words emphasized with intonation?

NCT would consider the transcript by the police and Shuy as incomplete, making it much more difficult to provide an objective analysis. This makes NCT a valuable tool for forensic linguists and criminologists.

The length of the pause is not indicated in either the police transcript or Shuy's analysis of the tape. Consequently in the NCT's analysis the pause duration is not indicated, it is being placed where Shuy said it occurred, that is, after the word bribe. NCT places the pause after the word bribe due to the fact that in the example Shuy noted that the pause fell just before the last two syllables, meaning the pause came after the word bribe. The last two syllables are the words "would you?"

It is very important to point out that NCT parsing technology would automatically identify the pause and insert it exactly where it occurred in the conversation. For this example, we have to reply on what Shuy said in the article regarding the placement of the pause.

NCT is designed to deal with conversational speech and has an archival database of conversations. NCT would be able to query the archival database to retrieve the words "would" and "wouldn't" to statistically analyze how many two turn arrays contain both words and the ordering of the words.

If the outcome of the query, and statistical analysis, showed that in natural occurring conversation, when the words "would" and "wouldn't" are spoken by the same participant, across a two turn array, the word "wouldn't" statistically occurs as the second word in the first turn, and the word "would" would be located at the beginning of the second turn. This information would add validation to Shuy's testimony that only one reading of the sentence made sense; "I wouldn't take a bribe, would you?"

The article does not elaborate on how it is that Shuy came to the conclusion that "only one reading of the sentence made sense". However, with NCT as a tool, the information from its Archival database could provide the logic behind Shuy's conclusion, allowing for a stronger argument based on statistical analysis. The archival database would have stored all the previous and subsequent turns and arrays, that occurred before and after the critical statement. A complete NCT transcript analysis would provide a great deal of information for the justification of one interpretation over another.

Continuing with the same point; the article does not provide a complete transcript of the tape recording between the two Nevada brothel commissioners. The point here is that if NCT had access to the the entire tape recording, it would have been able to build an initial conversational profile of the two commissioners. Hypothetically, the statically analysis of the turn-taking pattern of the one commissioner may have shown that Shuy's conclusion was correct, that the word "wouldn't" could only be located in the first turn, which is what Shuy contends.

This is an example of one NCT benefit to the field of Forensic Linguistics. Automating the tabulation of turns, turn-taking, and arrays of turns, provides an objective context for a forensic linguist to increase the accuracy of his/her analysis.

NCT's analysis and profiling capability will play an important role in validating criminologist's findings.

CONCLUSION, RAMIFICATIONS, AND SCOPE

From the above it will be seen that I have discovered, inter alia, a basic unit of speech analysis and interpretation not previously used in linguistics: the "turn". As stated, the turn is defined as a a point in time when the current speaker makes, produces, or forms an in-breath, a sentence intonation, a question intonation, a vowel extension, a pause for 0.3 second or greater, or a when an another participant to the conversation vocalizes a sound or a word. The point in time is determined when a participant to a conversation, referred to as a "speaker" executes a conversational action such as producing an utterance, a pause, a word, an in-breath, or when speaker change occurs. A plurality of turns taken by a single speaker is termed an "array". NCT can readily quantify turns and arrays by a computer arranged to recognize spoken words, pauses, and utterances such as in-breaths and the like. In the past, traditional linguistic approaches used a grammatical sentence as a basic unit of analysis. Although rigorous, the traditional linguistic approach is awkward and time-consuming. NCT's system of turn analysis enables more rapid and efficient computer analysis of utterances. It also opens the possibility of computerized voice response systems that respond to natural conversational events, instead of pre-defined, limited-length answers to predefined questions. NCT is a useful teaching tool in classrooms and can be used by forensic linguists in courtroom settings.

While the above description contains many specificities, these should not be construed as limitations on the scope, but as exemplifications of some present embodiments. Many other ramifications and variations are possible within the teachings herein. For example, a voice-response system can discern whether a human response is a question or a statement of fact (sentence intonation). NCT can be used to analyze conversational interactions between more than two speakers. NCT can be used to detect hesitation by a speaker through vowel extensions. NCT can also be applied to non-human animal speech whenever one or more sounds are followed by an in-breath or pause followed by more sounds.

Thus the scope should be determined by the appended claims and their legal equivalents, rather than the examples and particulars given.

The invention claimed is:

1. A system for analyzing a human or non-human animal's speech, comprising:
   a computer having a memory,
   a microphone operably connected to said computer,
   said computer arranged to digitize voiced sounds uttered by a speaker and received by said microphone to provide a digitized signal representative of said voiced sounds,
   software operable in said computer and arranged
      (a) to receive said digitized signal and recognize, in said signal, turns and arrays of said turns, and
      (b) to sort, classify, and retrievably store said turns in said memory,
   whereby said human or non-human animal speech can be analyzed by selectively retrieving said turns from said memory.

2. The system of claim 1 wherein said software includes speaker identification software for identifying the speaker when said microphone also receives a turn from a second speaker.

3. The system of claim 1, further including a recording device for recording said voice sounds uttered by said speaker.

4. The system of claim 1, further including a timer for measuring and recording the duration of each a turn and entering the duration of said turn into said memory of said computer.

5. A method for analyzing human speech, comprising:
   providing a computer,
   providing a microphone operably connected to said computer and arranged to receive turns made by a human speaker,
   providing a software program operable in said computer for recognizing said turns,
   storing all of said turns in an archival database,
   analyzing said turns using said software program to identify said human speaker, to recognize words and sounds uttered by said speaker, to recognize both turns and arrays of turns taken by said speaker, and to store the resultant analysis of said turns and arrays of said turns in a data stream record,
   whereby said archival database contains a record of all of said turns and said data stream record contains said analysis of said turns.

6. The method of claim 5 wherein said software program includes voice recognition software for classifying said turns as either a pause, in-breath, word, vowel extension, question intonation, or sentence intonation.

7. The method of claim 5 wherein said software program includes speaker identification software for identifying said speaker when said microphone also receives turn content from a second speaker.

8. The method of claim 5, further including a recording device for recording said human speech.

9. The method of claim 5, further including measuring the length of each of said turns by said human speaker.

10. The method of claim 9, further including compiling a cumulative sum of said length of said turns by said human speaker and inserting said sum into said data stream record.

11. The method of claim 5, further including a look-up program and a database of keywords that are pre-defined conversational events among said turns made by said human speaker, said look-up program arranged to search said database of keywords for said pre-defined conversational events.

12. A method for using turns to analyze human speech, comprising:
   providing a computer with a memory,
   providing a microphone operably connected to said computer,
   providing a data stream record operable within said memory,
   providing an archival database operable within said memory,
   providing software program operable in said computer, said software program being arranged to analyze turns and turn content received by said microphone,
   said software program being arranged to analyze said turn content by recognizing and tabulating turns as a pause, in-breath, vowel extension, sentence intonation, question intonation, or word, and to attribute said turn to an individual speaker,
   storing all of said turns in said archival database, and tabulating, categorizing, and storing said turns in said data stream record for retrieval,
   whereby said data stream record contains a retrievable record of turns uttered by said human speaker.

13. The method of claim 12 wherein said software program includes voice recognition software for recognizing said turns as either a pause, in-breath, word, vowel extension, question intonation, and sentence intonation.

14. The method of claim 12 wherein said software program includes speaker identification software for identifying said speaker when said microphone also receives turns from a second speaker.

15. The method of claim 12, further including providing a recording device for recording said human speech.

16. The method of claim 12, further including a timer for measuring the duration of each of said turns.

17. The method of claim 12, further including measuring the length of each turn.

18. The method of claim 12, further including a look-up program arranged to search a database of keywords that are pre-defined conversational events among said turns made by said human speaker, said look-up program arranged to search said database of keywords for said pre-defined conversational events.

19. The method of claim 12 wherein said method for using turns to analyze human speech is used in teaching colloquial use of turns to a student by:
   (a) recording said student's speech,
   (b) analyzing said student's speech using said software program to produce said data stream record,
   (c) retrieving another speaker's data stream record,
   (d) comparing said student's speech with said colloquial use of turns by said another speaker by comparing said student's data stream record with said another speaker's data stream record, and
   (e) showing said student differences between said student's speech and said another speaker's speech so that said student understands colloquial use of turns.

20. The method of claim 12 wherein said method for using turns to analyze human speech is used in forensics by:
   (a) recording a first person's speech,
   (b) analyzing said first person's speech using said software program and storing said first person's speech in said first person's data stream record,
   (c) recording a second person's speech,
   (d) analyzing said second person's speech using said software program and storing said second person's speech in said second person's data stream record, and
   (e) comparing said first person's data stream record with said second person's data stream record in order to determine whether or not said first person is the same as said second person even though said first person's data stream and said second person's data stream are not identical in wording.

* * * * *